United States Patent Office.

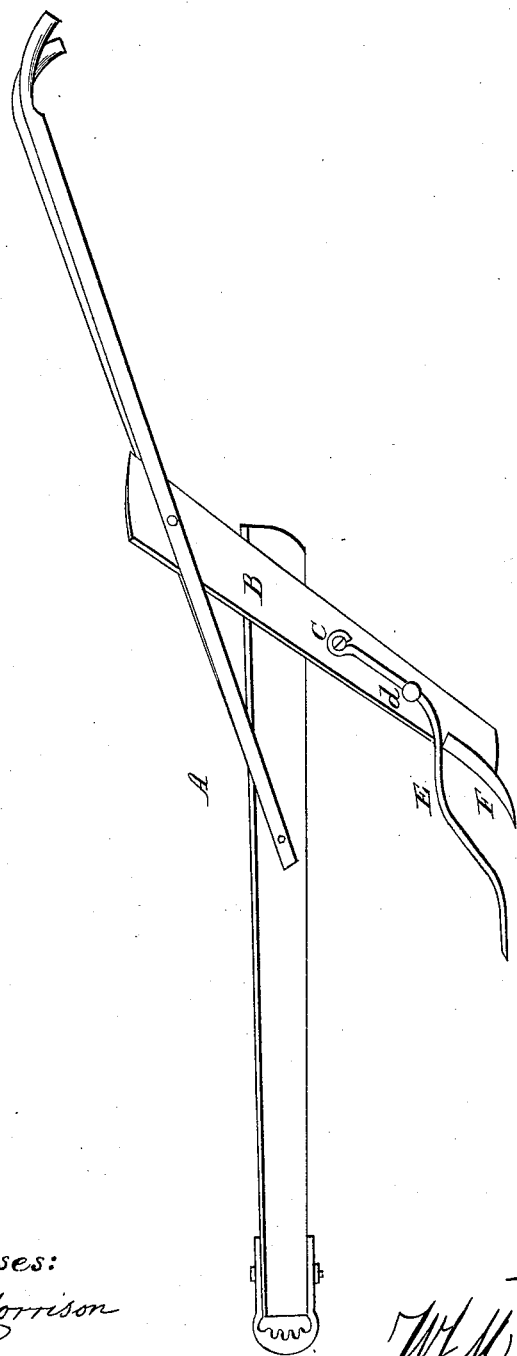

WILLIAM J. M. BATCHELDER, OF DAYTON, OHIO.

Letters Patent No. 63,134, dated March 26, 1867.

IMPROVEMENT IN SHOVEL-PLOUGH GUARD.

The Schedule referred to in these Letters Patent and making part of the same.

TO ALL WHOM IT MAY CONCERN:

Be it known that I, WILLIAM J. M. BATCHELDER, of Dayton, in the county of Montgomery, in the State of Ohio, have invented a new and improved Shovel-Plough Guard; and I do hereby declare that the following is a full and exact description thereof, reference being had to the accompanying drawings, and to the letters of reference marked thereon.

The nature of my invention consists in attaching to the post of a shovel-plough a guard, which is used for the purpose of raising the lower leaves of tobacco out of the way of the shovel while ploughing.

To enable others skilled in the art to make and use my invention, I will proceed to describe its construction and operation.

The figure represents an ordinary shovel-plough, with the guard attached.

A represents the plough, and B the post of the plough, to which is attached the guard E, which is attached to the post by a screw or bolt at c, and by a bolt, having a hole in its head for the reception of the guard at d. The position of the guard laterally is nearly directly over the outer edge of the shovel, and the point should be a little above the surface of the soil. The adjustment of the guard may be effected by replacing the bolts c and d, or simply by bending, or both combined. The guard may be constructed of either round or angular iron or steel. The use of this guard is in ploughing tobacco, the guard raising the leaves, enabling the ploughman to plough very near the stalks, and thereby saving the necessity for the usual amount of hoeing.

What I claim as my invention, and desire to secure by Letters Patent, is—

The shovel-plough guard E, when constructed substantially as herein described and for the purpose specified.

WILLIAM J. M. BATCHELDER.

Witnesses:
   FRANCIS B. MORRISON,
   LEVI WENGER.